United States Patent [19]
Klayman et al.

[11] Patent Number: 5,841,378
[45] Date of Patent: Nov. 24, 1998

[54] SYSTEM AND APPARATUS FOR, AND METHOD OF, INTERFACING A DEMODULATOR AND A FORWARD ERROR CORRECTION DECODER

[75] Inventors: Jeffrey T. Klayman, Mansfield, Mass.; Fay Yew, Madison, Ala.

[73] Assignee: Motorola, Inc., Schaumburg, Ill.

[21] Appl. No.: 738,130

[22] Filed: Oct. 25, 1996

[51] Int. Cl.$^6$ .................................................... H04J 4/00
[52] U.S. Cl. ................................................. 341/61; 341/50
[58] Field of Search .................................. 341/50, 61, 94; 375/324

[56] References Cited

U.S. PATENT DOCUMENTS 5,384,805  1/1995  Hawkins et al. ............................ 375/7
5,473,601  12/1995  Rosen et al. ................................ 370/50

*Primary Examiner*—Brian K. Young
*Assistant Examiner*—Peguy JeanPierre
*Attorney, Agent, or Firm*—Jeffrey T. Klayman

[57] ABSTRACT

A system (400) and apparatus (200, 300) for, and method (100) of, interfacing a demodulator and a forward error correction decoder enables a forward error correction decoder to be used in conjunction with an otherwise incompatible demodulator. Data received from the demodulator having a first encoding and formatted as M bits per baud at a first baud rate is encoded into data having a second encoding. The data having the second encoding is output to the forward error correction decoder as N bits per baud at a second baud rate as required by the forward error correction decoder.

26 Claims, 4 Drawing Sheets

SYSTEM AND APPARATUS FOR, AND METHOD OF, INTERFACING A DEMODULATOR AND A FORWARD ERROR CORRECTION DECODER

FIELD OF THE INVENTION

This invention relates, in general, to data communications and data communications systems and devices and, more specifically, to an apparatus and method for interfacing a demodulator and a forward error correction decoder.

BACKGROUND OF THE INVENTION

With the advent of multimedia communications, data transmission has become increasingly complex. For example, multimedia communication applications such as real time transmission of digitally encoded video, voice, and other forms of data, may require new forms and systems for data communication and data transmission. One such new communication system is the CableComm™ System currently being developed by Motorola, Inc. In the Cable-Comm™ System, a hybrid optical fiber and coaxial cable network (HFC network) is utilized to provide substantial bandwidth over existing cable lines to secondary stations such as individual, subscriber access units, for example, in households having new or preexisting cable television capability. These coaxial cables are further connected to fiber optical cables to a central location having centralized, primary (or "head end") controllers or stations having receiving and transmitting capability. Such primary equipment may be connected to any variety of networks or other information sources, from the Internet, various on line services, telephone networks, to video/movie subscriber service. With the CableComm™ System, digital data may be transmitted both in the downstream direction, from the primary station or controller (connected to a network) to the secondary station of an individual user (subscriber access unit), and in the upstream direction, from the secondary station to the primary station (and to a network).

In the CableComm™ System, downstream data is currently intended to be transmitted using 64 quadrature amplitude modulation ("64-QAM") at a rate of 30M bps (megabits per second), over channels having 6 MHz bandwidth in the frequency spectrum of 50–750 MHz, and potentially up to 1 GHz. Anticipating asymmetrical requirements with large amounts of data tending to be transmitted in the downstream direction rather than the upstream direction, less capacity is provided for upstream data transmission, using π/4 differential quadrature phase shift keying (π/4-DQPSK) modulation in the frequency band from 5–42 MHz with a symbol rate of 384K symbols/sec with 2 bits/symbol. In addition, the communication system is designed to have a multipoint configuration, i.e., many secondary stations (also referred to as subscriber access units) transmitting upstream to a primary station, with one or more primary stations transmitting downstream to the secondary stations. The communication system is also designed for asynchronous transmission, with users transmitting and receiving packets of encoded data, such as video or text files. In addition, it is also highly likely that transmission may be bursty, with various users receiving or transmitting data at indeterminate intervals over selected channels in response to polling, contention, or other protocols from the primary station, rather than transmitting a more continuous and synchronous stream of information over a dedicated or circuit switched connection.

Like many communications networks, the HFC network is a shared medium, i.e. the downstream channel is received by multiple subscriber stations, and the upstream channel must be shared by multiple subscriber stations. The HFC network supports multiple downstream and upstream channels over a single cable segment, where each channel consists of a specific frequency band that is carried over the cable. In the typical HFC network, only specific downstream and upstream channels will be used for carrying data traffic, with other channels used for broadcast television signals, voice telephony signals, video-on-demand services, and other services now and in the future.

Also like many communications networks, the HFC network is susceptible to many types of noise that can cause the signals being carried over the network to be corrupted, resulting in lower data throughput. With the high data rates carried across these networks, especially on the downstream channels, even a small amount of noise can result in the loss of a substantial amount of data. Thus, in order to compensate for the noise, forward error correction is typically employed. Forward error correction comprises an error correcting code that is added to the user data to allow a receiver to correct certain types and sizes of errors that occurred during the transmission of the data. The transmitting unit generates the error correcting code from the user data, and transmits encoded data comprising the user data and the error correcting code. The receiving unit decodes the encoded data to recover the user data. The error correcting code allows the receiver to detect and correct errors that occurred during transmission of the encoded data.

There are many types of error correcting codes. The many types of error correcting codes are generally categorized as either convolutional codes, which correct random bit errors, and block codes, which correct block errors. Two or more error correcting codes may be used together to obtain total error correcting power that is greater than the sum of the capabilities of the individual codes. These are often called "concatenated" codes. A popular concatenated code uses a convolutional "inner" code and a block "outer" code.

A convolutional code is used to correct random bit errors in a serial stream of data. A convolutional code is typically specified by a code rate. For example, a rate 1/2 code means that the encoder outputs two encoded bits for every one bit of data. Typical convolutional code rates include 1/2, 2/3, 3/4, 4/5, 5/6, 6/7, and 7/8 codes.

A block code is used to correct burst errors. In a block code, the error correcting code is computed over a fixed-size block of data. One example of a block error correcting code is a Reed-Solomon code. A Reed-Solomon code is typically specified by the parameter pair (N,K), where N is the codeword size and K is the block size. Thus, an N-byte codeword consists of K data bytes and (N-K) redundancy bytes which represent the error correcting code. The maximum number of symbol errors that can be corrected by a Reed-Solomon code is $t=(N-K)/2$, where a symbol is typically one 8-bit byte. A commonly used Reed-Solomon code is a (128,122) code, where the codeword size is 128 bytes, each codeword consists of 122 data bytes and 6 redundancy bytes, and the decoder can correct up to three byte errors in each codeword.

The performance of a block error correcting code such as a Reed-Solomon code can often be improved using a technique called "interleaving". Typically, when interleaving is not used, codewords from a block encoder are transmitted sequentially in the order that they are generated by the encoder. However, when interleaving is used, multiple codewords are processed simultaneously, with a portion of each of a plurality of codewords being transmitted interleaved with portions of the other codewords. Interleaving has the effect of spreading a large burst error across multiple codewords, with each of the plurality of codewords having to correct only a portion of the large burst error. The correcting power of an interleaver is determined by an interleaver depth, which specifies the number of codewords that are interleaved together.

The CableComm™ System employs a Reed-Solomon block code with interleaving on the downstream channels. Convolutional coding is not used. In addition to the Reed-Solomon block code with interleaving, a scrambling function is also used on the downstream channels to improve the performance of the 64-QAM modulation.

All of the above mentioned technologies, namely 64-QAM modulation, Reed-Solomon forward error correction coding, convolutional coding, interleaving, and scrambling are all known in the art. Moreover, integrated circuits that implement these various technologies are commercially available. One example is the Broadcom BCM3100 QAM-Link™ Receiver, which is a commercially available integrated circuit that performs, among other things, 64-QAM demodulation. Another example is the LSI Logic L64709 concatenated code decoder chip, which contains a Viterbi decoder (to decode a convolutional code), a deinterleaver, a Reed-Solomon decoder, and a descrambler. Other concatenated code decoder chips are commercially available from Advanced Hardware Architectures (AHA) and VLSI Technologies. There are also single-function chips, for example, Viterbi decoder chips and Reed-Solomon decoder chips. It is desirable to use a concatenated code decoder chip instead of multiple single-function chips because the concatenated code decoder chip is more cost effective, is easier to design into a system, and takes up less space on a printed-circuit board.

One problem with the commercially available concatenated code decoder chips, such as the LSI Logic L64709, is that they are designed for use with QPSK and/or BPSK demodulators and do not interface directly to a 64-QAM demodulator such as the Broadcom BCM3100 QAMLink™ Receiver which is used by the CableComm™ System. A 64-QAM demodulator outputs six bits per baud, but the concatenated code decoder chips expect as input two bits per baud. Another problem with the commercially available concatenated code decoder chips is that they include a Viterbi decoder to decode a convolutional code, where the CableComm™ System does not use a convolutional code on the downstream channels. Thus, a need has remained for an apparatus and method for interfacing a demodulator and a forward error correction decoder.

DETAILED DESCRIPTION OF THE INVENTION

As mentioned above, a need has remained for an apparatus and method for interfacing a demodulator and a forward error correction decoder. The apparatus and method in accordance with the present invention provides such interfacing. As a consequence, the apparatus and method of the present invention enables one of the commercially available concatenated code decoder chips to be used with a commercially available 64-QAM demodulator chip.

Figure 1:
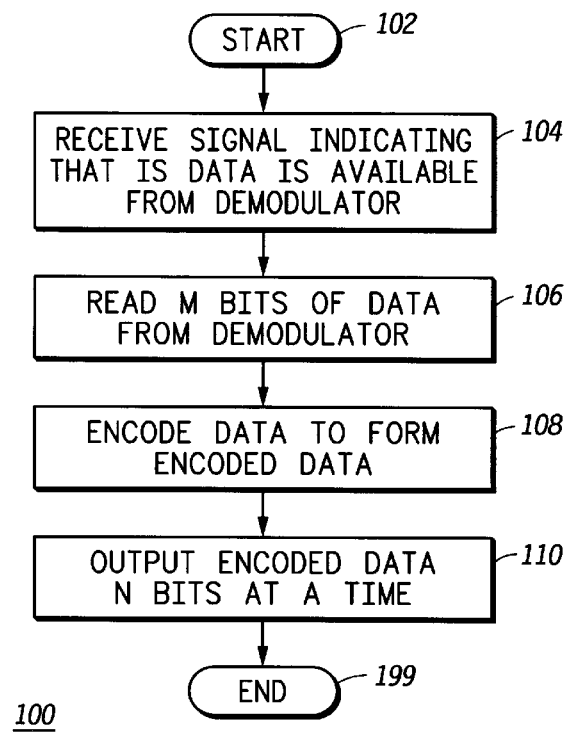
FIG. 1 is a flow diagram depicting a method of interfacing a demodulator to a forward error correction decoder.

FIG. 1, numeral 100, is a flow diagram depicting a method of interfacing a demodulator to a forward error correction decoder. Beginning with start step 102, the method receives a signal indicating that data is available from the demodulator, in step 104. Upon receipt of the signal, the method proceeds to read M bits of data from the demodulator, in step 106. In the preferred embodiment, six bits of data are read from the demodulator upon receipt of the signal. The method then proceeds to encode the M bits of data to form encoded data, in step 108. The process of encoding the M bits of data comprises the addition of an error correcting code to the data, resulting in the encoded data having K data bits, where K is greater than M. For example, in the preferred embodiment, a rate 1/2 convolutional code is added to the data, resulting in two bits of encoded data for every one bit of unencoded data, or twelve bits of encoded data. The encoded data is output N bits at a time as required by the decoder, in step 110, and the method terminates in step 199. In the preferred embodiment, the encoded data is output two bits at a time to the decoder.

In the preferred embodiment, the method 100 as depicted in FIG. 1 is repeated at a rate R equal to 5 MHz (Megahertz), which is the rate at which the demodulator outputs each unit of six data bits. Because the method 100 is repeated, it is critical that the process of encoding the data and the process of outputting N bits of data at a time to the decoder be completed before receiving the signal to begin a next repetition of the method. Thus, the number of N-bit outputs that must occur in order to complete the processing of one M-bit input is equal to the number of encoded bits (K) divided by the number of bits per output (N). The continuous rate of N-bit outputs, then, is equal to the number of N-bit outputs multiplied by the repetition rate R. For example, in the preferred embodiment, the number of N-bit outputs that must occur in order to compete the processing of one M-bit input is equal to six (i.e. twelve encoded data bits divided by two bits per output), and the continuous rate of N-bit outputs is equal to 30 MHz (i.e. six N-bit outputs multiplied by 5 MHz repetition rate).

Figure 2:
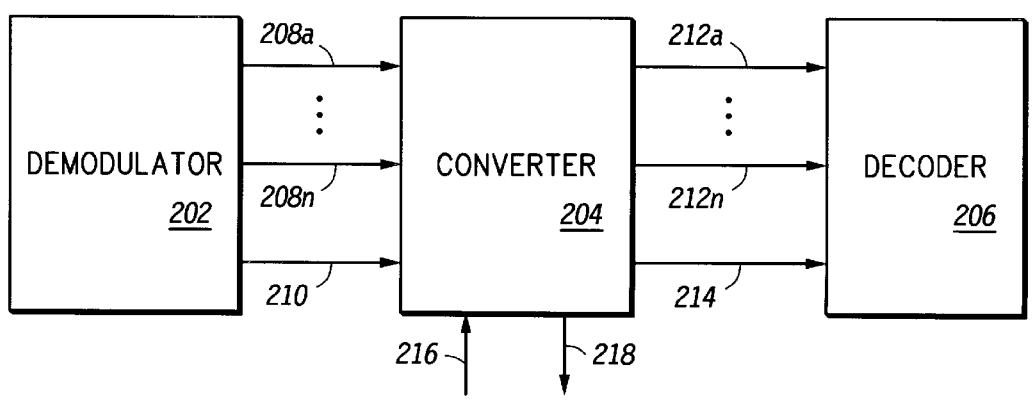
FIG. 2 is a block diagram which shows a demodulator interfacing to a forward error correction decoder via a converter.

FIG. 2, numeral 200, is a block diagram which shows a demodulator 202 interfacing to a forward error correction decoder 206 via a converter 204. In the preferred embodiment, the demodulator 202 is a Broadcom BCM3100 QAMLink™ Receiver, the forward error correction decoder 206 is a LSI Logic L64709 concatenated code decoder chip, and the converter 204 is a Field-Programmable Gate Array (FPGA) programmed to perform the conversion function necessary to interface the demodulator 202 to the forward error correction decoder 206. Converter 204 accepts first data having a first encoding and formatted as a first number of bits per baud (M) at a first baud rate (X) from demodulator 202 over a plurality of input data lines 208a through 208n when signaled by baud clock 210. In the preferred embodiment, the first encoding comprises scrambling, Reed-Solomon block coding, and interleaving, the first number of bits per baud (M) is equal to the six bits per baud output by the 64-QAM demodulator, and the first baud rate (X) is equal to 5 Mbaud (Megabaud). Converter 104 converts the first data having the first encoding and formatted as the first number of bits per baud (M) at the first baud rate (X) into second data having a second encoding and formatted as a second number of bits per baud (N) at a second baud rate (Y), as required by decoder 206. Converter 204 outputs the second data formatted as the second number of bits per baud (N) over encoded output lines 212a through 212n at the second baud rate (Y), and provides output clock 214 synchronized with the outputting of the second data. Converter 204 uses reference clock 216 to generate clocking signals including output clock 214. In the preferred embodiment, the second encoding comprises scrambling, Reed-Solomon block coding, and interleaving as in the first data plus the addition of a rate 1/2 convolutional code, the second number of bits per baud (N) is equal to two bits per baud formatted as if generated by a QPSK demodulator, and the second baud rate (Y) is equal to 30 Mbaud.

Continuing to refer to FIG. 2, converter 204 of the preferred embodiment is also capable of outputting an unencoded serial data stream which is equal to the first data converted into a serial format and output serially one bit at a time on unencoded output line 218, with output clock 214 synchronized with the outputting of the unencoded serial data.

While the preferred embodiment of converter 204 adds a rate 1/2 convolutional code to the data, other embodiments of converter 204 can exist. One such embodiment adds a convolutional code having a rate other than 1/2, for example, a rate 3/4 code. Another such embodiment substitutes or adds one or more of a plurality of error correcting codes for the rate 1/2 convolutional code. Yet another such embodiment performs no additional coding other than that already present in the demodulated data.

While the preferred embodiment of converter 204 adds a rate 1/2 convolutional code to the data, it is also possible for converter 204 to add a convolutional code having a different code rate, or also to add one or more of a plurality of forward error correction codes to the data.

Figure 3:
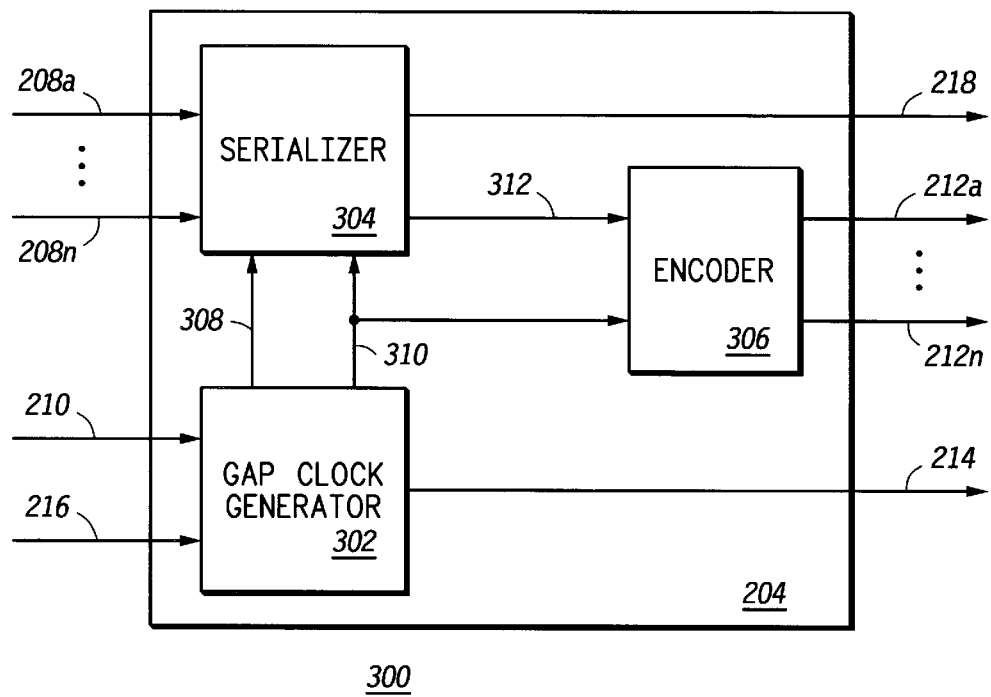
FIG. 3 is a block diagram of converter.

FIG. 3, numeral 300, is a block diagram of converter 204. Gap clock generator 302 generates all necessary signals to clock data from the demodulator to the forward error correction decoder. In the preferred embodiment, gap clock generator 302 accepts as inputs reference clock 216 and baud clock 210 which is generated by the demodulator. In the preferred embodiment, reference clock 216 is a 40 MHz (Megahertz) clock signal and baud clock 210 is a 5 MHz clock signal. Gap clock generator 302 generates a load signal 308 which is synchronized with baud clock 210 and is used to signal the serializer 304 each time data bits are available on input data lines 208a through 208n. In the preferred embodiment, serializer 304 reads six bits of data from input data lines 208a through 208n on each load signal 308. Serializer 304 converts the data from input data lines 208a through 208n into a serial bit stream, and outputs the bits serially on serial data line 312 synchronized with shift signal 310. Shift signal 310 is a clock signal generated by gap clock generator 302 having a clock rate which is a multiple of the baud clock rate, where the multiple is equal to the number of bits per baud transferred on input data lines 208a through 208n. Thus, in the preferred embodiment, shift signal 310 runs at six times the baud rate or 30 MHz, since serializer 304 must shift out six bits for every baud.

Continuing to refer to FIG. 3, encoder 306 reads one bit of data from serial data line 312 on each shift signal 310. Encoder 306 encodes the serial data, and outputs the data on encoded output lines 212a through 212n. In the preferred embodiment, encoder 306 adds a rate 1/2 convolutional code to the data, and outputs two bits for every one bit it reads from serial data line 312. Output clock 214 is generated by gap clock generator 302 synchronized with the availability of data on encoded output lines 212a through 212n.

In the gap clock generator of the preferred embodiment, the 40 MHz reference clock is used to generate the 30 MHz shift signal and output clock by inserting gaps into the 40 MHz clock such that the transitions on those signals occur at only 30 MHz. However, in another embodiment, reference clock 216 can be eliminated, and the baud clock can be used by the gap clock generator to generate the higher rate shift signal and output clock by using a multiplier circuit as is known in the art.

Figure 4:
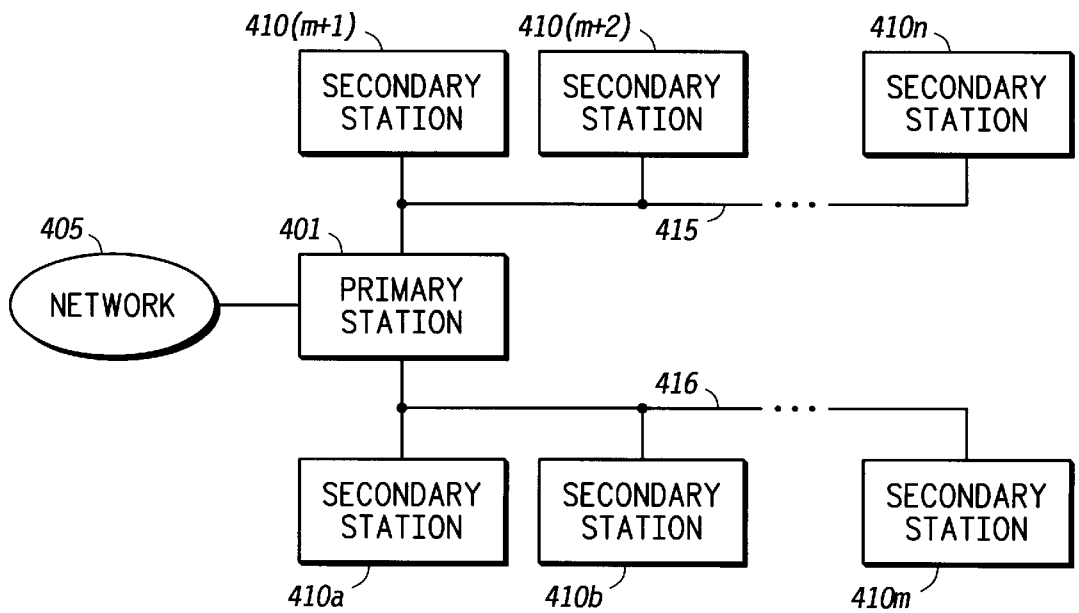
FIG. 4 is a block diagram illustrating a communication system.

FIG. 4 is a block diagram illustrating a communication system 400. As illustrated in FIG. 4, a primary station 401, also referred to as a primary device or primary transceiver unit, is coupled to a plurality of secondary stations $410_a$ through $410_n$ (collectively referred to as secondary stations 410), via communications media 415 and 416. In the preferred embodiment, communications media 415 and 416 are hybrid optical fiber and coaxial cable. In other embodiments, the communication media may be coaxial cable, fiber optic cable, twisted pair wires, and so on, and may also include air, atmosphere or space for wireless and satellite communication. The primary station 401 is also coupled to a network 405, which may include networks such as the Internet, on line services, telephone and cable networks, and other communication systems. The secondary stations $410_a$ through $410_n$ are illustrated in FIG. 4 as connected to the primary station 401 on two segments or branches of a communications medium, such as communications media 415 and 416. Equivalently, the secondary stations $410_a$ through $410_n$ may be connected to more than one primary station, and may be connected to a primary station (such as primary station 401) utilizing more or fewer branches, segments or sections of any communication medium.

Continuing to refer to FIG. 4, in the preferred embodiment, the communications medium, such as communications media 415 and 416, has or supports a plurality of channels (equivalently referred to as communications channels). For ease of reference, the communications channels in which a primary station, such as the primary station 401, transmits information, signals, or other data to a secondary station, such as secondary station $410_n$, are referred to as downstream channels or downstream communication channels. Also for ease of reference, the communications channels in which a secondary station, such as secondary station $410_n$, transmits information, signals, or other data to a primary station, such as primary station 401, are referred to as upstream channels or upstream communication channels. These various upstream and downstream channels may, of course, be the same physical channel or may be separate physical channels, for example, through time division multiplexing or frequency division multiplexing. These various channels may also be logically divided in other ways, in addition to upstream and downstream directions. In the preferred embodiment, the communications medium is hybrid fiber coaxial cable, with downstream channels in the frequency spectrum (band) of 50–750 MHz, and with upstream channels in the frequency spectrum of 5–42 MHz.

Figure 5:
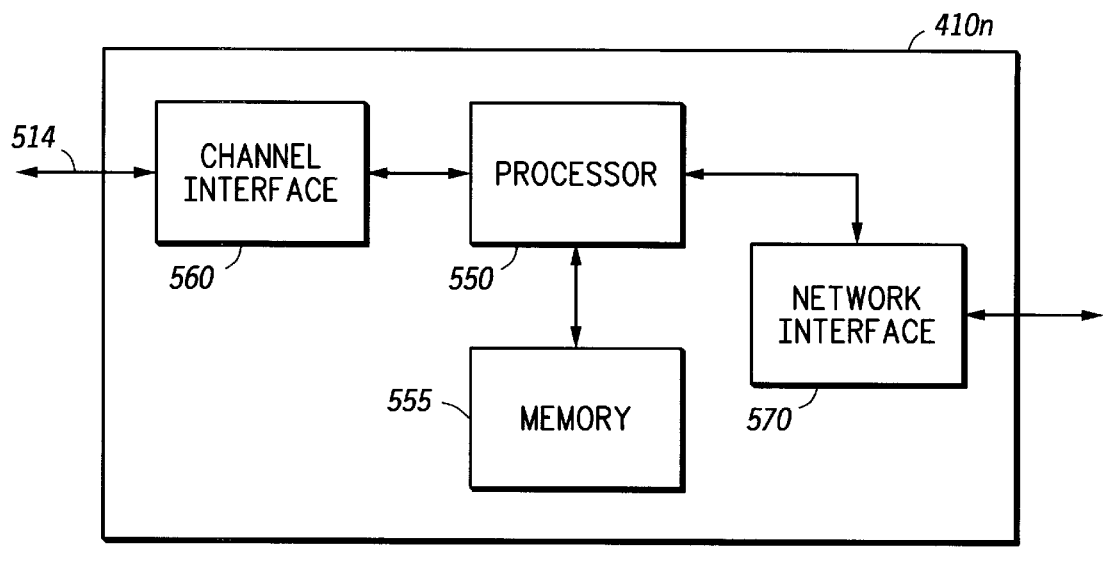
FIG. 5 is a block diagram illustrating a representative secondary station as would be utilized in the communication system.

FIG. 5, numeral 500, is a block diagram illustrating a representative secondary station $410_n$ (of the plurality of secondary stations 410) as would be utilized in communication system 400. The secondary station $410_n$ includes a processor (or processor arrangement) 550, with the processor 550 having or coupled to memory 555. In the preferred embodiment, the processor 550 is a Motorola M68302 processor (also known as an integrated multiprotocol processor), and the memory comprises random-access memory, flash-programmable read-only memory, and electronically-erasable read-only memory. The processor 550 is coupled to a network interface 570, such as an ethernet port or an RS232 interface, for connection to a computer, a workstation, or other data terminal equipment ("DTE"). The processor 550 is also coupled to a channel interface 560 for communication over the communication medium 514. The channel interface 560 includes a transmitter section for transmitting data on upstream channels and a receiver section for receiving data on a downstream channel, where the receiver section further includes a demodulator for demodulating a downstream data signal, a decoder for decoding forward error correction information contained in the data stream, and a converter for interfacing the demodulator to the decoder. In the preferred embodiment, the demodulator is a Broadcom BCM3100 QAMLink Receiver integrated circuit, the decoder is a LSI Logic L64709 concatenated code decoder, and the converter is a Field-Programmable Gate Array (FPGA) programmed to perform the conversion required to interface the demodulator to the decoder.

In the preferred apparatus embodiment illustrated in FIG. 5, the method illustrated in FIG. 1 may be programmed and stored in the secondary station 410 and, more particularly, in processor 550 (with its associated memory 555) or in any of a plurality of logic circuits, including a Field-Programmable Gate Array (FPGA), an Application-Specific Integrated Circuit (ASIC), and/or discrete hardware components.

Figure 6:
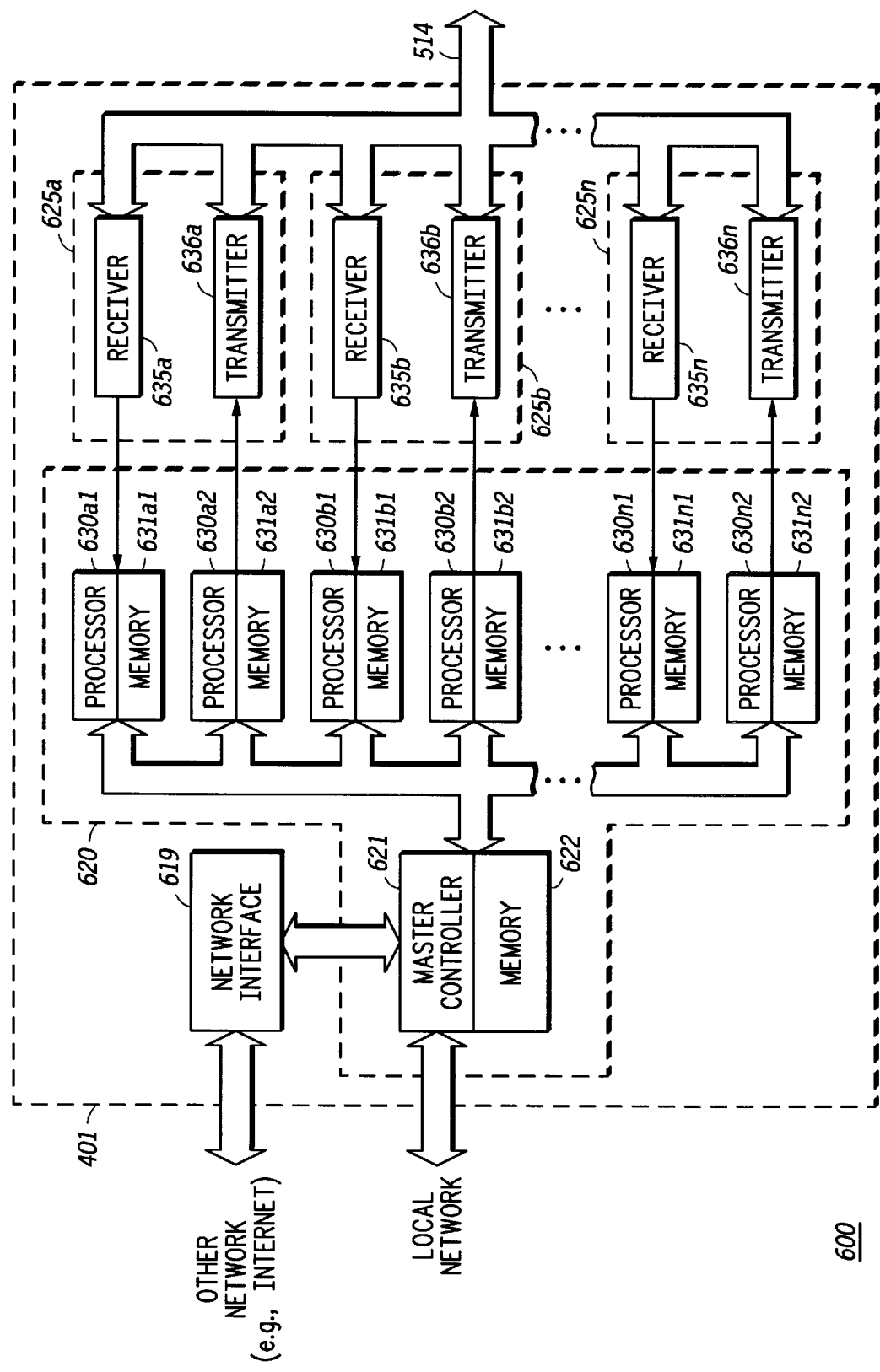
FIG. 6 is a block diagram illustrating a representative primary station as would be utilized in the communication system.

FIG. 6, numeral 600, is a block diagram illustrating a representative primary station 401 as would be utilized in communication system 400. The primary station 401 is coupled to a communication medium 514 for upstream and downstream communication to one or more secondary stations (not illustrated), and is coupleable to a network, such as the Internet, through a network interface 619. The primary station includes a processor arrangement 620 which is connected to a plurality of channel interfaces, channel interface $625_a$ through channel interface $625_n$, for communication over the communication medium 514. The processor arrangement 620 includes a master controller 621 having or connected to memory 622, and one or more additional processors $630_{a1}$ through $630_{n2}$ and corresponding associated memories $631_{a1}$ through $631_{n2}$. In the preferred embodiment, the master controller 621 is a Motorola M68040 processor, and the memory 622 is 16 MB RAM. The master controller 621 performs a variety of higher level functions in the preferred embodiment, such as spectrum management, routing functions, management of secondary stations, and communication protocol management (such as SNMP management). The master controller 621 is connected to a plurality of other processors, collectively referred to as processors 630 and separately illustrated as processor $630_{a1}$, processor $630_{a2}$, through processor $630_{n1}$ and processor $630_{n2}$. Each of these processors, processor $630_{a1}$, processor $630_{a2}$, through processor $630_{n1}$ and processor $630_{n2}$, is also coupled to or contains corresponding memory circuits, memory $631_{a1}$, memory $631_{a2}$, through memory $631_{n1}$ and memory $631_{n2}$. In the preferred embodiment, each of these processors 630 are also Motorola M68040 processors, while the corresponding memory circuits, memory $631_{a1}$ through memory $631_{n2}$, are 4 MB RAM. In the preferred embodiment, the processors 630 perform such functions related to upstream and downstream data protocols, such as sending a poll message or an acknowledgment message downstream. Each of these processors $630_{a1}$ through $630_{n2}$ of the processor arrangement 620 are connected to corresponding receivers and transmitters of the channel interfaces, channel interface $625_a$ through channel interface $625_n$ (collectively referred to as channel interfaces 625), namely, receiver $635_a$ through receiver $635_n$ (collectively referred to as receivers 635) and transmitter $636_a$ through transmitter $636_n$ (collectively referred to as transmitters 636). In the preferred embodiment, depending upon the functions implemented, each of the receivers $635_a$ through $635_n$ may include a Motorola M68302 processor, a Motorola 56000 series digital signal processor, a ZIF SYN integrated circuit, and an LSI Logic L64714 (Reed-Solomon decoder), for demodulation and for decoding forward error correction and cyclic redundancy checks. In the preferred embodiment, also depending upon the functions implemented, each of the transmitters $636_a$ through $636_n$ may include a Motorola M68302 processor, a Motorola 56000 series digital signal processor, a ZIF SYN integrated circuit, and an LSI Logic L64711 (Reed-Solomon encoder), for modulation and for coding for forward error correction and cyclic redundancy checks. As a consequence, as used herein, the channel interfaces 625 may be considered to perform the functions of data and other signal reception and transmission, regardless of the specific hardware implementations and additional functions which may or may not be implemented. The various memories illustrated, such as memory 622 or $631_{a1}$, may also be embodied or contained within their corresponding processors, such as master controller 621 or processor $630_{a1}$.

In the communication system 400 utilizing a primary station 401 and a plurality of secondary stations 410, the primary station transmits encoded data on a downstream channel. In the preferred embodiment, the encoding comprises scrambling, Reed-Solomon block coding, and interleaving. The encoded data is received by the plurality of secondary stations. A demodulator in each secondary station extracts the encoded data from the electronic signals that carry the encoded data across the downstream channel. In the preferred embodiment, the electronic signals that carry the encoded data across the downstream channel is 64-QAM modulation. Each secondary station also includes a decoder for decoding the encoded data. A converter in each secondary station converts the encoded data into a form usable by the decoder. In the preferred embodiment, the converter translates the six bits per baud of encoded data extracted by the demodulator, which is scrambled, Reed-Solomon block coded, and interleaved, into two bits per baud of data which is scrambled, Reed-Solomon block coded, interleaved, and convolutionally coded. Finally, the decoder decodes the converted data to recover unencoded data.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

We claim:

1. A method for interfacing a demodulator and a decoder, the demodulator outputting a first number of bits per baud having a first encoding at a first baud rate, and the decoder requiring a second number of bits per baud having a second encoding at a second baud rate, the method comprising the steps of:

(a) receiving from the demodulator the first number of bits per baud having the first encoding at the first baud rate;

(b) encoding the first number of bits per baud to form encoded data bits having the second encoding different than the first encoding; and (c) sending the encoded data bits to the decoder by outputting the encoded data bits formatted as the second number of bits per baud at the second baud rate.

2. The method of claim 1 wherein the first encoding consists of scrambling, Reed-Solomon block coding, and interleaving.

3. The method of claim 3 wherein the second encoding consists of scrambling, convolutional coding, Reed-Solomon block coding, and interleaving.

4. The method of claim 3 wherein the step of encoding the first number of bits per baud to form encoded data bits consists of adding a convolutional code to the first number of bits per baud.

5. A converter for interfacing a demodulator and a decoder, the demodulator outputting a first number of bits per baud having a first encoding at a first baud rate, and the decoder requiring a second number of bits per baud having a second encoding at a second baud rate, the converter comprising:

(a) a demodulator interface logic operably coupled to the demodulator to receive the first number of bits per baud having the first encoding the first baud rate; and (b) an encoder operably coupled to the demodulator interface logic, the encoder encoding the first number of bits per baud to form encoded data bits having the second encoding different than the first encoding and sending the encoded data bits to the decoder by outputting the encoded data bits formatted as the second number of bits per baud at the second baud rate.

6. The converter of claim 5 wherein the demodulator interface logic comprises:

(a) a clock generator operably coupled to the demodulator to receive a baud clock from the demodulator; and (b) a serializer operably coupled to the clock generator by a load signal and a shift signal generated by the clock generator, and wherein the encoder is operably coupled to the serializer by a serial data line and to the clock generator by the shift signal.

7. The converter of claim 6 wherein the serializer reads the first number of bits of data from the demodulator upon receipt of the load signal generated by the clock generator.

8. The converter of claim 6 wherein the serializer outputs one bit of data on a serial data line upon receipt of the shift signal generated by the clock generator.

9. The converter of claim 6 wherein the encoder reads one bit of data from the serial data line upon receipt of the shift signal generated by the clock generator.

10. The converter of claim 9 wherein the encoder further encodes the data read from the serial data line to form encoded data.

11. The converter of claim 10 wherein the encoder further outputs the encoded data on a plurality of encoded output lines upon receipt of the shift signal generated by the clock generator.

12. The converter of claim 9 wherein the encoder outputs the data read from the serial data line on an unencoded output line upon receipt of the shift signal generated by the clock generator.

13. The converter of claim 10 wherein the encoded data comprises the addition of a convolutional code to the first number of bits having the first encoding.

14. The converter of claim 6 wherein the clock generator receives a baud clock signal from the demodulator.

15. The converter of claim 14 wherein the clock generator generates the load signal upon receipt of the baud clock signal from the demodulator.

16. The converter of claim 14 wherein the shift signal generated by the clock generator is derived from the baud clock signal.

17. The converter of claim 14 wherein the shift signal generated by the clock generator is derived from the baud clock signal in conjunction with a reference clock signal.

18. The converter of claim 6 wherein the clock generator generates an output clock signal synchronized with the shift signal.

19. The converter of claim 5 wherein the first encoding consists of scrambling, Reed-Solomon block coding, and interleaving.

20. The converter of claim 19 wherein the second encoding consists of scrambling, Reed-Solomon block coding, interleaving, and convolutional coding.

21. The converter of claim 5 wherein the encoder adds a convolutional code to the first number of bits.

22. An apparatus for interfacing a demodulator to a decoder in a data communication system, the data communication system having a communication medium, the communication medium having a plurality of communication channels, the apparatus comprising:

(a) a processor;

(b) a memory integral with or operably coupled to the processor;

(c) a network interface operably coupled to the processor; and (d) a channel interface, operably coupled to the processor and coupleable to the communication medium, for reception of encoded data on a first communication channel of the plurality of communication channels, the channel interface further comprising:

(1) a demodulator;

(2) a converter, operably coupled to the demodulator, for receiving first data from the demodulator, said first data having a first encoding and received from the demodulator formatted as a first number of bits per baud at a first baud rate, and for converting the first data to second data having a second encoding and output by the converter formatted as a second number of bits per baud at a second baud rate; and (3) a decoder, operably coupled to the converter, for receiving the second data from the converter at the second baud rate.

23. The apparatus of claim 22 wherein the channel interface further comprises a transmitter for transmission of encoded data on a second communication channel of the plurality of communication channels.

24. A data communication system for interfacing a demodulator to a decoder in a data communication system, the data communication system having a communication medium, the communication medium having a plurality of communication channels, the data communication system comprising:

(a) a primary station, operably coupled to the communication medium, for transmitting first data having a first encoding and transmitted as a first number of bits per baud at a first baud rate on a first communication channel of the plurality of communication channels; and (b) a secondary station of a plurality of secondary stations, operably coupled to the communication medium, for receiving first data from the first communication channel of the plurality of communication channels, the secondary station further comprising:

(1) a demodulator;
(2) a converter, operably coupled to the demodulator, for receiving first data from the demodulator, said first data having a first encoding and received from the demodulator formatted as a first number of bits per baud at a first baud rate, and for converting the first data to second data having a second encoding and output by the converter formatted as a second number of bits per baud at a second baud rate; and
(3) a decoder, operably coupled to the converter, for receiving the second data from the converter at the second baud rate.

25. The data communication system of claim 24 wherein the secondary station further comprises a transmitter for transmission of encoded data on a second communication channel of the plurality of communication channels.

26. A converter for interfacing a demodulator and a decoder, the demodulator outputting a first number of bits per baud having a first encoding at a first baud rate, and the decoder requiring a second number of bits per baud having a second encoding at a second baud rate, the converter comprising:

(a) means for receiving from the demodulator the first number of bits per baud having the first encoding at the first baud rate;
(b) means for encoding the first number of bits per baud to form encoded data bits having the second encoding different than the first encoding; and
(c) means for sending the encoded data bits to the decoder by outputting the encoded data bits formatted as the second number of bits per baud at the second baud rate.

* * * * *